R. F. CAMPBELL.
SAFETY PIN.
APPLICATION FILED SEPT. 16, 1921.
1,409,667.
Patented Mar. 14, 1922.
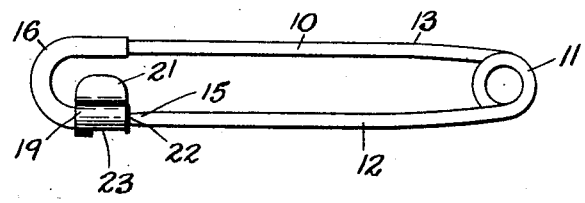
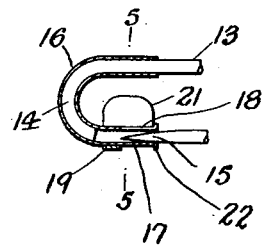 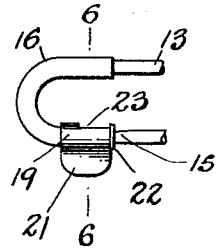 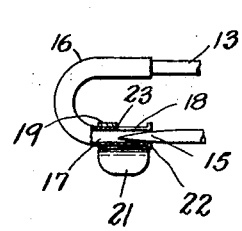
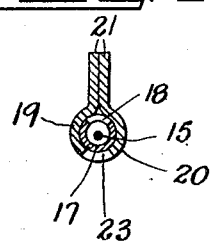 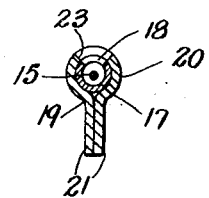
Inventor
Robert F. Campbell
By his Attorneys

UNITED STATES PATENT OFFICE.

ROBERT F. CAMPBELL, OF BROOKLYN, NEW YORK.

SAFETY PIN.

1,409,667.  Specification of Letters Patent.  Patented Mar. 14, 1922.

Application filed September 16, 1921. Serial No. 501,082.

*To all whom it may concern:*

Be it known that I, ROBERT F. CAMPBELL, a citizen of the United States, and residing at Brooklyn, in the county of Kings and State of New York, have invented certain new and useful Improvements in Safety Pins, of which the following is a specification, such as will enable those skilled in the art to which it appertains to make and use the same.

This invention relates to safety pins, and the object of the invention is to provide means for retaining the pointed member of safety pins in a suitable keeper as well as means for passing the end portion of said pointed member into and out of said keeper, and with this and other objects in view the invention consists in a safety pin of the class specified which is simple in construction and efficient in use, and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a side view of a safety pin on an enlarged scale and showing one of my improved keepers mounted in connection therewith;

Fig. 2 a sectional detail view of a part of the construction shown in Fig. 1;

Fig. 3 a view similar to Fig. 1 but showing only a part of the construction and with the keeper in a different position from that shown in Fig. 1;

Fig. 4 a view similar to Fig. 3 but showing part of the construction shown in section;

Fig. 5 a partial section on the line 5—5 of Fig. 2 on an enlarged scale; and,

Fig. 6 a partial section on the line 6—6 of Fig. 3 and on an enlarged scale.

In Fig. 1 of the drawing I have shown at 10 a safety pin of the usual or any preferred form of construction and, as shown in the accompanying drawing, said pin is composed of a rod or wire fashioned approximately centrally thereof to form a spring loop 11, and approximately parallel side members 12 and 13, the member 13 being longer than the member 12 and the end thereof being hook-shaped in form as shown at 14 in Fig. 2, while the end portion of the member 12 is pointed as shown at 15 in Fig. 2 to form the pointed member of the safety pin.

The hook-shaped end portion 14 of the member 13 is provided with a reinforcing casing 16 which is substantially U-shaped in form and one end thereof extends beyond the end of the member 13 to form a tubular keeper 17 to receive the pointed end portion 15 of the member 12.

The tubular keeper 17, in the construction shown, is provided on its inner face with an elongated aperture 18 to permit of the passage of the pointed end portion 15 of the member 12 into and out of said keeper 17. Rotatably mounted on the tubular keeper 17 is a lock member 19 comprising a sleeve portion 20, which fits around the tubular keeper 17 and radially directed ears 21 which form a finger piece to facilitate the rotation of the lock member 19.

The lock member 19 is held against displacement on the tubular keeper 17 by a flange 22 on the free edge of the keeper 17, as clearly shown in Figs. 2 to 4 inclusive, and the lock member 19 or the sleeve portion 20 thereof is provided opposite the ears 21 with an elongated aperture 23 which is adapted to register with the aperture 18 in the keeper 17 when the lock member 19 is in the position shown in Figs. 3, 4 and 6. In this position of said lock member the pointed end portion 15 of the member 12 may be freely passed into and out of the keeper 17, and with said member or the pointed portion thereof within the keeper 17, the same may be retained therein by rotating the lock member 19, or moving said member into the position shown in Figs. 1, 2 and 5 to prevent the removal of said member 12, or the pointed end portion 15 thereof from the keeper 17.

It will be noted that when the lock member 19 is in its normal or operative position, the ears 21 thereof lie in the plane of the safety pin proper thus giving a neat and finished appearance to complete the device and facilitates its use as safety pins are now used, and in attaching or detaching a safety pin, all that is necessary will be to move the lock member 19 from the position shown in Figs. 1, 2 and 5 into the position shown in Figs. 3, 4 and 6. It will be apparent that I am not necessarily limited to the specific details of construction herein shown and described, and various changes therein and modifications thereof may be made, within the scope of the appended claims, without departing from the spirit of my invention or sacrificing its advantages.

Having fully described my invention, what I claim as new and desire to secure by Letters Patent, is:—

1. A safety pin of the class described provided with a pointed member adapted to operate in connection with a keeper to hold said pointed member in a predetermined position, and means encircling said keeper and rotatable thereon for retaining the pointed member of the pin within said keeper.

2. A safety pin of the class described provided with a pointed member and a keeper adapted to receive said pointed member and to support the same in a predetermined position, and a lock member encircling said keeper and rotatable thereon and adapted in one position thereof to retain the pointed member of the safety pin within said keeper.

3. A safety pin of the class described provided with a pointed member and a keeper adapted to receive said pointed member and to support the same in a predetermined position, and a lock member encircling said keeper and rotatable thereon and adapted in one position thereof to retain the pointed member of the safety pin within said keeper and in the other position thereof to permit of the movement of the pointed member into and out of said keeper.

4. A safety pin of the class described provided with a pointed member, a tubular keeper adapted to receive said pointed member and to support the same in a predetermined position, said keeper being provided with an aperture through which the pointed member of the safety pin is adapted to pass, and a lock sleeve encircling said keeper and rotatable thereon and provided with an aperture adapted to register with the aperture of said keeper, said lock sleeve being provided with means to facilitate the movement thereof into operative and inoperative positions.

5. A safety pin of the class described provided with a pointed member, a tubular keeper adapted to receive said pointed member and to support the same in a predetermined position, said keeper being provided with an aperture through which the pointed member of the safety pin is adapted to pass, a lock sleeve encircling said keeper and rotatable thereon and provided with an aperture adapted to register with the aperture of said keeper, said lock sleeve being provided with means to facilitate the movement thereof into operative and inoperative positions, and means for retaining said lock sleeve on said keeper.

In testimony that I claim the foregoing as my invention I have signed my name in presence of the subscribing witnesses this 15th day of Sept. 1921.

ROBERT F. CAMPBELL.

Witnesses:
  C. E. MULREANY,
  H. E. THOMPSON.